United States Patent [19]

Pepper

[11] Patent Number: 4,993,340
[45] Date of Patent: Feb. 19, 1991

[54] BOAT STRUCTURE

[76] Inventor: Orlyn G. Pepper, 4093 Carpenter Rd., Ypsilanti, Mich. 48197

[21] Appl. No.: 411,824

[22] Filed: Sep. 25, 1989

[51] Int. Cl.⁵ .............................................. B63B 3/00
[52] U.S. Cl. ...................................... 114/61; 114/292
[58] Field of Search ................. 114/61, 123, 266, 283, 114/292

[56] References Cited

U.S. PATENT DOCUMENTS

| | | | |
|---|---|---|---|
| 2,775,218 | 12/1956 | Kapusnyk | 114/61 |
| 3,839,979 | 10/1974 | Wassel | 114/61 |
| 4,223,620 | 9/1980 | Dudouyt | 114/61 |
| 4,582,012 | 4/1986 | Montgomery | 114/61 |
| 4,730,571 | 3/1988 | Hedlund et al. | 114/61 |

FOREIGN PATENT DOCUMENTS

| | | | |
|---|---|---|---|
| 3701945 | 8/1988 | Fed. Rep. of Germany | 114/61 |
| 9219491 | 4/1982 | U.S.S.R. | 114/61 |
| 499 | of 1852 | United Kingdom | 114/61 |

Primary Examiner—Jesus D. Sotelo
Attorney, Agent, or Firm—Charles W. Chandler

[57] ABSTRACT

A boat pontoon has a V-shaped keel region and a frame on deck connected to points along the keel region by rods of adjustable effective length. Any limited part of the keel region can be deflected in one direction by increasing the length of the rod connecting the frame to that part of the keel region and in the opposite direction by reducing the length of that rod.

19 Claims, 2 Drawing Sheets

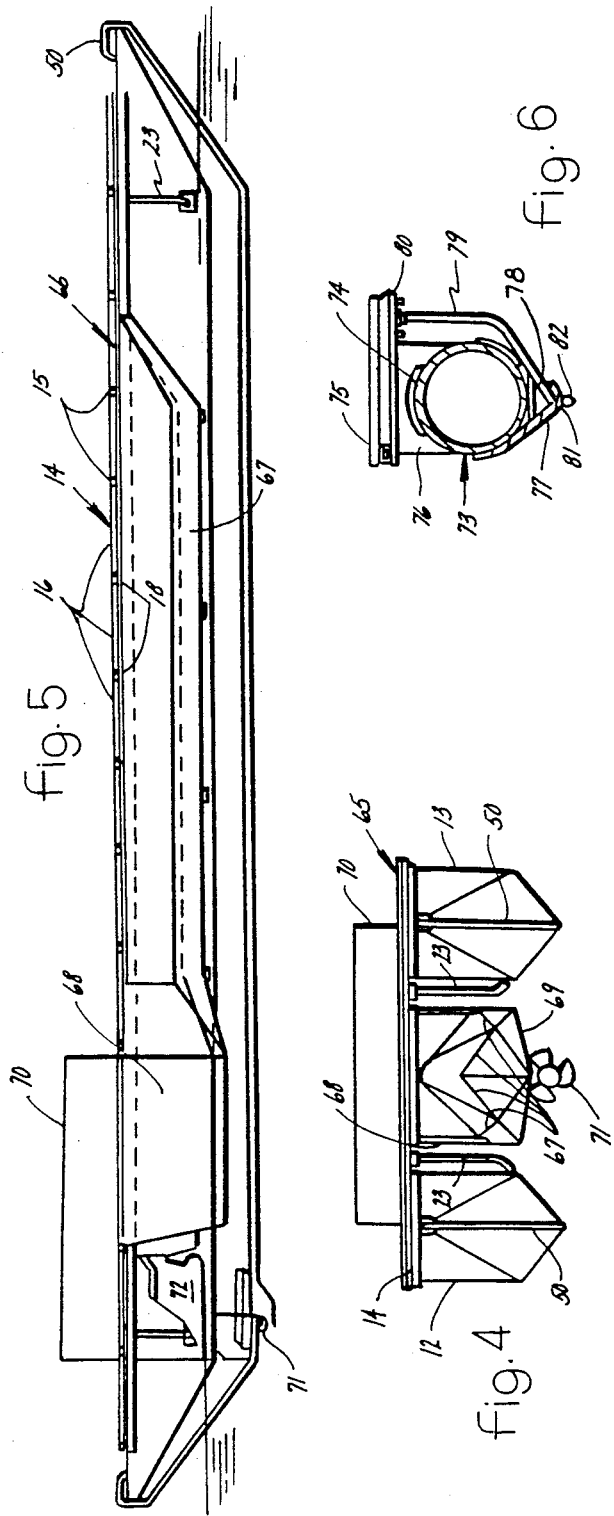

BOAT STRUCTURE

BACKGROUND OF THE INVENTION

This invention relates to pontoon boat structures and particularly to structures that strengthen the pontoons, increase the deck area of the boat, and make it easier to steer the boat in the water and to support it without damage when it is out of the water.

Most commercial pontoon boats are based on two parallel cylindrical floats made of sheet metal bent to form round tubes that are closed and sealed watertight at each end and along each seam. While round floats provide the greatest buoyancy per square foot of the sheet metal used to make them, they have several important disadvantages. For one thing the deck bridged across the pontoons is joined to them in such limited areas that the structure cannot withstand much wave action. For another, the hydrodynamic inefficiency of such pontoons requires a considerable amount of power to force the boat forward at anything above a sedate speed, and the boats are not easy to steer. In addition, when hauled out of water, the round sheet metal can be easily bent and torn and is difficult to repair. This leads to problems in beaching boats with round pontoons and in towing them on a trailer.

Efforts have been made to improve pontoon boats by various constructions. In U.S. Pat. No. 2,775,218, to Kapusnyk shows a boat in which tubular aluminum pontoons are connected together by arms that pivot at each end to allow the whole structure to be folded up. The pontoons have elliptical cross-sections, and each pontoon has two small, rounded fins spaced along the bottom.

U.S. Pat. No. 3,839,979 to Wassell shows another collapsible pontoon boat structure.

U.S. Pat. No. 4,223,620 to Dudouyt shows a rigid catamaran structure having floats, each consisting of molded shells joined together along a central seam and at least partly filled with rigid foam.

U.S. Pat. No. 4,582,012 to Montgomery shows a boat that has two inflatable pontoons, U.S. Pat. No. 4,730,571 to Hedlund et al. shows a pontoon boat having a parallel linkage connected to it and providing pivotal connections between the pontoons and a central passenger seat.

SUMMARY OF THE INVENTION

It is an object of this invention to provide an improved pontoon boat of greater structural integrity than prior pontoon boats and thus better able to withstand wave action.

It is also an object of this invention to provide a pontoon boat in which the bottom of each pontoon is V-shaped and the pontoons include means to adjust the alignment of their keel regions.

A pontoon for a boat in accordance with this invention includes a horizontal deck with relatively vertical sides, and a V-shaped bottom with a keel region along the lowest part of the bottom. Guide bars are rigidly joined to the deck to extend transversely across it and to be parallel to each other. The guide bars are spaced apart in the longitudinal direction of the pontoon to constitute part of a rigid frame by which the pontoon is connected to a parallel pontoon and on which a passenger deck is constructed.

The pontoon also includes adjusting means attached to the rigid structure and to a location spaced from the deck in the direction toward the keel region. By actuating the adjusting means, the keel region, and particularly the lowermost part of the keel region, can be offset transversely with respect to the longitudinal direction of the boat to bring the lowermost part of the keel region into proper alignment. In effect, this corrects improper toe-in or toe-out of the keel region, depending on the direction of the required adjustment A suitable form of adjusting means is a relatively vertical rod, the lower end of which is rigidly attached to the pontoon structure. The other end of the rod has nuts screwed on it embracing a rigid part of the frame structure so that, as the nuts are moved along the thread toward or away from the lower end of the rod, the distance between the part of the pontoon structure embraced by the nuts and the part to which the lower end of the rod is rigidly attached will be either increased or decreased, thereby shifting the location of the keel region transversely. Typically, there are several such adjusting means spaced apart along the length of the pontoon, permitting different parts of the keel region to be separately shifted by different amounts to achieve the desired overall alignment.

A rod is rigidly attached along the length of the keel region at the lowest part thereof to serve as protective runner when a boat consisting of two or more pontoons of the type just described is brought up on land or stacked on a trailer or other rigid support.

A complete pontoon boat can be made using two or more pontoon structures of the type just described connected together by connection means that engage corresponding guide bars on the pontoons. The connection means include bars rigidly joined to the corresponding guide bars on the pontoons, for example, by being welded to them.

A particularly advantageous type of connection means is an aluminum channel of U-shaped cross section having the proper dimensions to fit snugly over the guide bars. When these connection channel members are laid on the guide bars so as to embrace at least one part of each guide bar, the connection channels are then welded to the guide bars that they engage. Additional lengths of suitable bar material are then joined to end portions of each adjacent pair of the connection channels and, in some cases, to intermediate parts of the channel, to form a ladder-like structure of sufficient strength to keep the proper spacing and alignment between the guide bars, the connection bars, and, thus, between the pontoons.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the views, and in which:

FIG. 1 is a plan view of a pontoon boat structure according to this invention.

FIG. 4 is an end view of a three-pontoon boat structure according to this invention.

FIG. 5 is a cross sectional side view along the line 5—5 in FIG. 4 of the boat structure in that figure.

FIG. 6 is a modified embodiment of a boat pontoon incorporating features of this invention.

DETAILED DESCRIPTION OF THE PREFERRED EMBODIMENT

Figure 2:
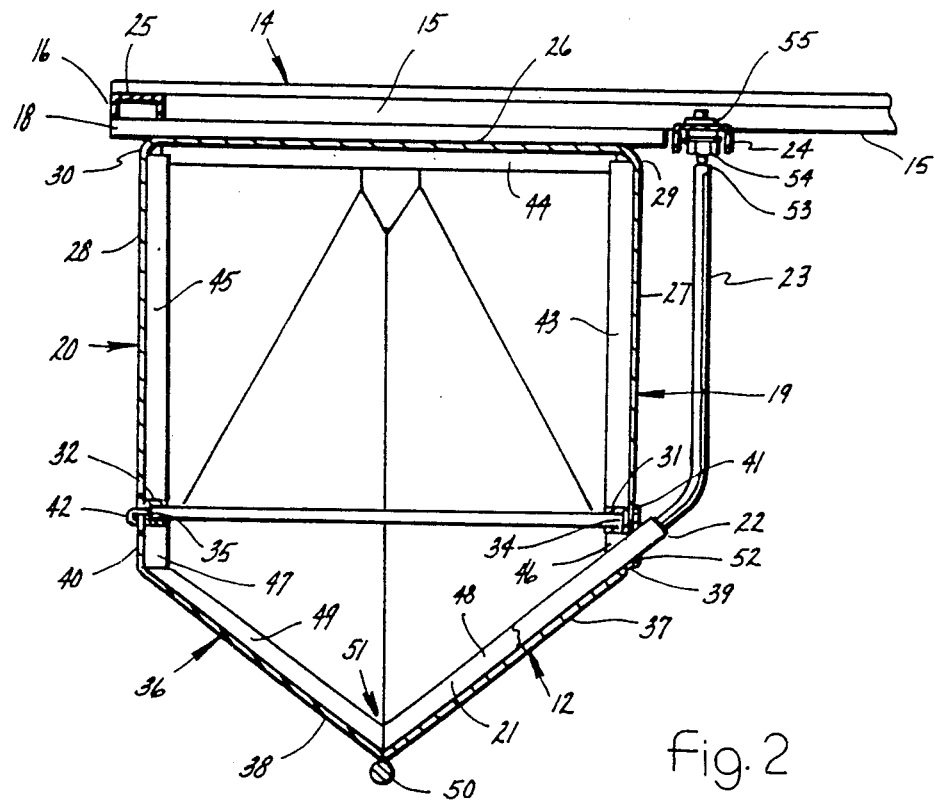
FIG. 2 is a cross-sectional view of one of the pontoons along the line 2—2 in FIG. 1.

FIG. 1 shows a pontoon boat 11 that has two pontoons 12 and 13 connected together by rigid means in the form of a ladder-like frame 14 consisting of a number of transverse connecting members 15 and longitudinal members 16 and 17 rigidly attached to end portions of each of the transverse connecting members. Each of the transverse connecting members is attached to a pair of guide bars 18 only one of which is shown in FIG. 1. The guide bar 18 is rigidly joined to the pontoon 12 and extends slightly beyond the sides 19 and 20 of the pontoon, as is typical of all the other guide bars under each of the transverse members 15 on each of the pontoons 12 and 13. The guide bars 18 constitute part of the rigid means, along with the frame 14.

Part of the upper surface of the pontoon 12 has been torn away to show some of the interior structure thereof. This includes a channel 21 of U-shaped cross section welded to the bottom of the pontoon 12 and embracing a tube 22, which is welded to the channel. The upper end of the tube extends through the side wall 20, 19 and a rod 23 inserted in that end of the tube is bent to extend through a longitudinal member 24 rigidly attached to each of the connecting members 15 to constitute part of the rigid means joining the pontoons 12 and 13 together.

It is not necessary that the longitudinal member 24 extend the full length of the frame 14. FIG. 1 also shows an alternative arrangement in which only short longitudinal members 24a are attached to alternate ones of the transverse members 15 at the proper location on each to receive a respective one of the rods 23. It is to be understood that a boat would be constructed using either long longitudinal members, only, like the member 24 or only short ones, like the members 24a. Both types are shown in FIG. 1 only for illustrative purposes.

The entire upper surface of the frame 14 is normally covered by a passenger deck 25, only a small fraction of which is shown in order not to obscure the arrangement of the frame, the pontoons 12 and 13, and the rods 23.

The enlarged cross sectional view in FIG. 2 shows the pontoon 12 as having a flat deck 26 from which the two vertical sides 19 and 20 are bent down. In this embodiment, the deck and sides are made of one sheet of aluminum bent to form a large, inverted channel of U shaped cross section with corners 29 and 30, and the lower edges 27 and 28 of the sides 19 and 20, respectively, are welded to much smaller U-shaped channel members 31 and 32 that hold an interior frame 33. More specifically, the channel members 31 and 32 have vertical portions 34 and 35, and each of the edges 27 and 28 is welded to the upper half of the respective vertical portion to extend approximately halfway across it in a vertical direction, leaving the lower half of each vertical portion 34 and 35 available to receive the upper edges of the bottom portion 36 of the pontoon.

The cross-sectional configuration of the bottom portion is defined by two relatively flat, lower plates 37 and 38 that form the V-shaped bottom, per se. The upper edge portions of the plates 37 and 38 are bent to extend vertically upward as narrow vertical side portions 39 and 40, The upper edges of these side portions are welded to the lowermost edges of the sides 27 and 28 by seam welds 41 and 42 to make the pontoon a watertight structure. Prior to joining the bottom and top portions of the pontoon together, interior frame members 43, 44, and 45 can be welded to the inner surfaces of the side 19, the deck 26, and the side 20, respectively. Short vertical frame members 46 and 47 can be affixed to the inner surfaces of the vertical portions 39 and 40, respectively, of the lower part 36 of the pontoon before it is attached to the upper part at the channel members 31 and 32.

The channel member 21 consists of two portions, a portion 48 welded to the inner surface of the plate 37 and another portion 49 welded to the inner surface of the plate 38. Part of the portion 48 of the channel 21 is broken away to show the position of the tube 22 in it. The lower end of the tube extends to the lower part of the keel region 51, and the upper end of the tube extends out through the side wall portion 39, in this embodiment. The tube is welded to the portion 48 of the channel 21 and to the vertical portion 39. To provide some leeway for the point of attachment of the tube to the vertical portion 39, a small plate 52 having a hole large enough to receive the tube 22 is welded to the outer surface of the vertical portion 39, and the perimeter of the hole is welded to the outer surface of the tube 22.

A lower part of the rod 23 extends into the upper end of the tube 22 by a distance sufficient, taking into account the bend in the rod 23, to place the upper end of the rod 23 in the proper location to enter a hole in the longitudinal member 24. After placing the rod in the proper position, it is welded to the upper end of the tube 22 to keep the pontoon 12 watertight. The upper end of the rod 23 has a threaded portion 53 that extends through the hole in the longitudinal member 24, which is shown to be a channel that has an inverted U-shaped cross section. The hole through which the rod 23 passes is in the top part of the inverted U-shaped channel member. A rod 50 is welded along the entire length of the lowest part of the keel region 51 to serve as a runner when a boat comprising the pontoon must be dragged across the ground or along the bed of a trailer or other transporter or storage structure.

Means are provided to shift the vertical portion of the rod 23 up or down to a limited extent. Such means include two nuts 54 and 55 screwed on the threaded portion 53 at the upper end of the rod 23. The nut 54 is below the longitudinal member and the nut 55 is above it. By backing the nut 55 off and running the nut 54 farther up toward the top end of the rod 23, the rod 23 can be pushed downwardly resulting in a slight shift of the bottom of the keel region 51 to the left relative to the position as shown in FIG. 2. Conversely, by backing off the nut 54 and screwing the nut 55 down more tightly, the keel region 51 may be pulled to the right relative to the position in which it is shown in FIG. 2. Alternatively, the upper end of the rod 23 can be fixedly attached to the longitudinal member 24 and the extent to which the lower end of the rod should enter the tube 22 can be calculated according to the load to be placed on it and according to the desired position of the keel region. The rod 22 can then be inserted into the tube according to these calculations and welded properly in place.

Figure 3:
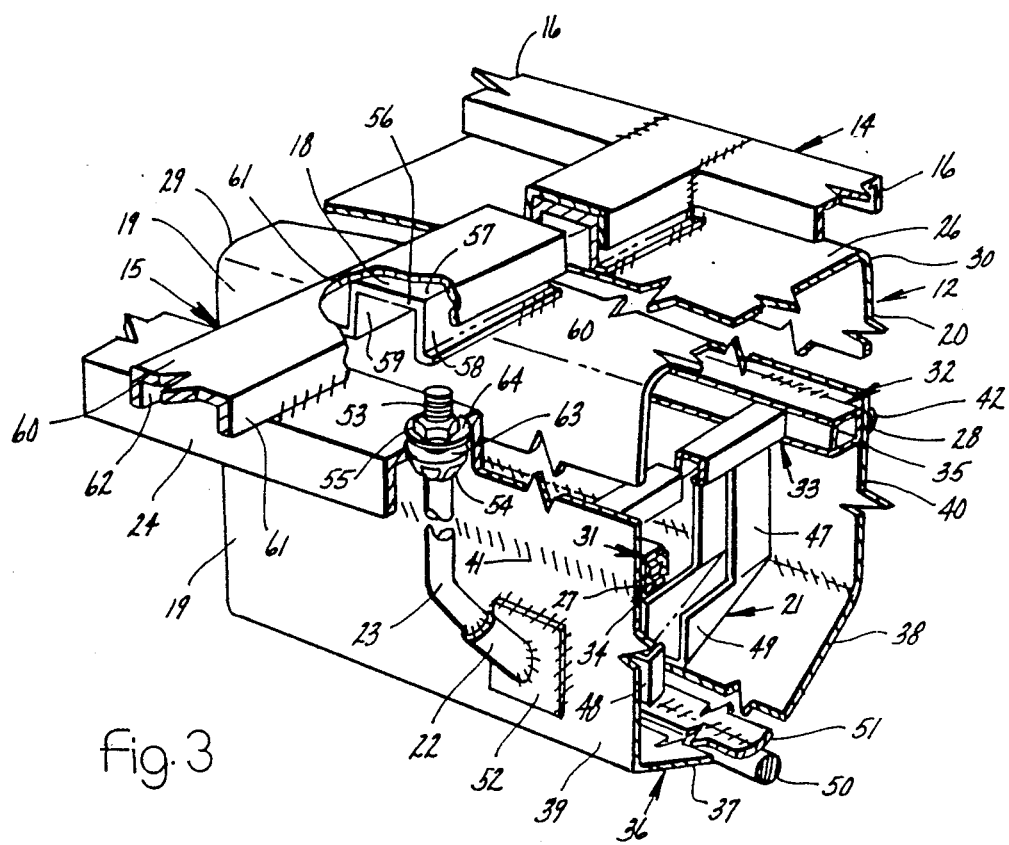
FIG. 3 is a fragmentary, perspective view of the pontoon shown in cross-section in FIG. 2.

FIG. 3 shows the key parts of the pontoon 12 with sections of plane surfaces cut away to condense the figure. It can be seen that the end 56 of the guide bar 18 extends beyond the plane of the wall 19, and it is to be understood that the other end of the guide bar also extends beyond the plane of the other wall 20. The guide bar is an extruded aluminum channel with an inverted U shaped cross section defined by a plate 57 and two walls 58 and 59 perpendicular to the plate. The edges of the walls 58 and 59 are welded to the top surface of the deck 26 at spaced locations.

The connecting member 15 is another extruded aluminum channel with an inverted U-shaped cross section defined by a plate 60 and walls 61 and 62 to allow the channel 15 to fit between them. However, the walls 58 and 59 are higher than the walls 61 and 62 so that the frame 14 is spaced a short distance from the deck 26, which makes it easier to attach the components of the frame 14 to the guide bars 18.

The longitudinal member 24 is shown as if it were cut across at the axis of the hole through which the rod 23 passes. The nuts 54 and 55 are shown along with washers 63 and 64 with the member 24 sandwiched between them. It is clear from this figure that the rod 23 should not be directly under one of the transverse connecting members 15 but should be in the clear so that the nuts 54 and 55 are at least relatively freely accessible to be tightened or loosened in order to force the upper end of the rod 23 up or down to distort the cross-sectional configuration of the pontoon 12 and bring its keel region 51 into proper alignment.

It should be noted that, in order to join the pontoon 12 to another pontoon, all that is required as to the spacing of the guide bar 18 from similar guide bars along the deck 26 is that, for each guide bar 18 on the pontoon 12, there be a matching guide bar on the other pontoon in exact alignment with the guide bar 18. In fact, assembly of the boat can be further facilitated by spacing all of the guide bars precisely equal distances apart as well as precisely transverse, or perpendicular, to the longitudinal direction of the pontoon. Then, the frame 14 can be made separately in a jig and laid upon all of the guide bars 18 at one time and then welded to them.

FIGS. 4 and 5 show an end view and a cross-sectional view, respectively, of a larger pontoon boat 65 that has three pontoons. The two on the outside can be the pontoons 12 and 13. The pontoon 66 in the center in this embodiment has a bottom 67 that is an inverted V, or more specifically, is W-shaped, over most of its length. The aft portion 68 of the pontoon 66 is enlarged and has a normal V-shaped bottom 69 to provide more space for a motor (not shown) covered by a housing 70. The motor is connected to a propellor 71 by a standard drive 72.

The forward part of the pontoon 66 is not as deep as the side pontoons and normally does not touch the water, or just barely does. However, if a heavy load of passengers boards the boat 65, the pontoons will sink in deeply enough to cause the bottom of the pontoon 66 to enter the water and support some of the weight.

As in FIG. 1, the boat 65 in FIGS. 4 and 5 has a bar 50 running beneath each keel and up over each end. Each end of the bar 50 forms a loop for a mooring line and is welded to the deck 26.

Boats of the type shown in FIGS. 1 and 5 can be of substantial size: an overall length of 34 ft. is easily attainable. Because of the strength of the V-shaped bottoms and the protection afforded by the rod 50, they can be easily and safely beached and pulled onto a trailer to be towed to other locations. Thus, the owner is not restricted to a single location. Nor is it necessary to arrange for a mooring, since such boats can be hauled out of the water after each use. The long length of attachment of each transverse connecting member 15 to each guide bar 18 gives great strength to the overall structure and allows the boat to withstand rough water that would send boats with round pontoons scurrying for shelter.

FIG. 6 shows an alternative pontoon 73 based on a tube 74 of circular cross section. As is standard practice with boats having pontoons of circular cross section, the passenger deck 75 is supported on saddles 76. In order to obtain the advantage of a V-shaped bottom, an extra sheet of metal 77 bent into a Vee is welded to the sides of the tube 74. A cross member 78 further stabilizes the location of the sheet 77 to the tube 74. An adjusting rod 79 goes from a rigid structure 80 similar to the frame 14 in the other figures to a location adjacent the keel region 81. A rod 82 welded along the bottom of the keel region serves as a runner if a boat based on pontoons like the pontoons 73 has to be beached or dragged onto a trailer.

Having described my invention, I claim:

1. A boat structure comprising:
   an elongated buoyant pontoon hull comprising a deck and a keel region, each extending longitudinally along the hull;
   rigid means affixed to, and extending transversely with respect to, the deck and beyond the deck on at least one side thereof;
   adjusting means attached to a first point of attachment on the hull at a location spaced from the deck in the direction toward the keel region and to a second point of attachment on the rigid means offset transversely from a position directly above the first point of attachment, the adjusting means being settable to determine the distance between the first and second points of attachment to set the position of the keel region transversely relative to the longitudinal direction of the hull.

2. The boat structure of claim 1 in which the second point of attachment is outboard of the deck.

3. The boat structure of claim 1 in which the adjusting means comprises threaded means engaging the rigid means to adjust the effective length of the adjusting means between the first and second attachment points.

4. The boat structure of claim 1 in which the adjusting means comprises a rod, one part of said rod being connected to the rigid means outboard of the deck and another part of said rod being rigidly attached to the hull at a location between the deck and the keel region, the length of the rod between said parts being determined by the load on the boat structure and the extent of offset of the keel region relative to the deck and nearer the other end of the rod.

5. The boat structure of claim 1 in which the adjusting means comprises a rod, one end of which is connected to the rigid means outboard of the deck and is longitudinally adjustable with respect to the rigid means, and the other end of which is rigidly attached to the hull at a location between the deck and the keel region.

6. The boat structure of claim 5 in which the rod extends through the side of the hull at the location between the deck and the keel region and the other end of the rod is attached to the inner surface of the hull at the keel region.

7. The boat structure of claim 6 comprising, in addition, a channel member welded to the inner surface of the keel region and extending upwardly from the lowest portion of the keel region to receive the lower end of the rod, the rod being welded to the channel member.

8. The boat structure of claim 7 in which the channel member comprises a hollow tube that extends through, and is welded watertight to, a side portion of the hull between the keel region and the deck, the lower end of the rod extending into the tube and being welded watertight to it.

9. The boat structure of claim 8 in which the rigid means comprises longitudinally extending bar means rigidly joined to the transverse bars, each of the rods being adjustably connected to the longitudinally extending bar means at locations therealong offset longitudinally from the nearest transverse bar.

10. The boat structure of claim 9 in which the longitudinally extending bar means comprises a plurality of short bars, each joined rigidly to a respective one of the transverse bars.

11. The boat structure of claim 9 in which the longitudinally extending bar means comprises a lonngitudinal are attached to a plurality of the transverse bars.

12. The boat structure of claim 1 in which the rigid means comprises a plurality of transverse guide bars rigidly attached to the deck at specific locations spaced apart longitudinally along the deck, the boat structure comprising additional adjusting means, each adjustably attached to its own first point of attachment at a respective location on the hull, all of the first points of attachment being spaced from the dec inn the direction of the keel region, each of the additional adjusting means also being attached to its own second point of attachment at a respective location on the rigid means offset transversely from a position directly above the respective first point of attachment, each of the additional adjusting means being separately adjustable to change the distance between its own first and second points of attachment to adjust transversely the portion of the keel region immediately adjacent the respective first point of attachment.

13. The boat structure of claim 12 in which at least some of the transverse bars extend outboard of one side of the hull and at least some of the transverse bars extend outboard of the other side of the hull, and the longitudinally extending bar means comprise at least a first longitudinal bar alongside the one side of the hull and at least a second longitudinal bar alongside the other side of the hull.

14. The boat structure of claim 13 in which some of the rods are adjustably connected to the first longitudinal bar and others of the rods are adjustably connected to the second longitudinal bar.

15. A pontoon boat structure comprising:
first and second parallel pontoons, each comprising a deck and a keel region;
rigid means joining the pontoons together, the rigid means comprising a plurality of parallel guide bars rigidly joined to the deck of each pontoon, each of the guide bars being perpendicular to the longitudinal direction of the pontoons and aligned with a corresponding guide bar on the other pontoon, and a rigid frame comprising transverse members each joined rigidly to a respective guide bar on the first pontoon and a guide bar aligned therewith on the second pontoon;
first adjusting means connected between the keel region of the first pontoon and a first point of attachment on the rigid means, the adjusting means being adjustable to change the distance between the keel region of the first pontoon and the first point of attachment to shift the keel region of the first pontoon transversely; and
second adjusting means connected between the keel region and a second point of attachment on the rigid means, the second adjusting means being adjustable to change the distance between the keel region of the second pontoon and the second point of attachment to shift the keel region of the second pontoon transversely.

16. The pontoon boat structure of claim 15 in which the transverse members comprise channels, each of which fits over and is rigidly joined to a pair of aligned guide bars, one on the first pontoon and the other on the second pontoon.

17. The pontoon boat structure of claim 15 in which the rigid means further comprises first and second longitudinal channel means rigidly attached to the transverse members adjacent the first and second pontoons, respectively, and between the first and second pontoons, the first and second points of attachment being on the first and second longitudinal channel means, respectively.

18. The pontoon boat of claim 17 in which the first and second points of attachment are offset in the longitudinal direction from the transverse members closest thereto.

19. A boat structure which includes:
at least one elongated buoyant pontoon having a top deck and a substantially V-shaped bottom;
frame means affixed to, and extending transversely with respect to the deck;
pontoon reinforcement means comprising a structural member attached to said frame at a location to one side of said pontoon deck and to said V-shaped bottom so as to reinforce said pontoon against transverse movement;
said V-shaped pontoon bottom comprising a pair of upwardly diverging plate members, and said structural member is arranged in a side-by-side relationship with and secured to one of said plate members at a position within said pontoon.

* * * * *